Aug. 17, 1965   U. KNICK   3,201,689
MEASUREMENT AMPLIFIER FOR SMALL DIRECT VOLTAGES
Filed Oct. 19, 1960   2 Sheets-Sheet 1
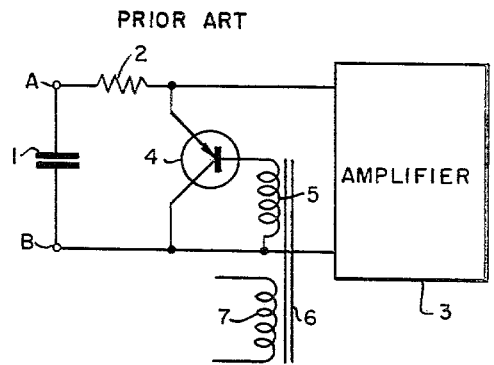
FIG.1.
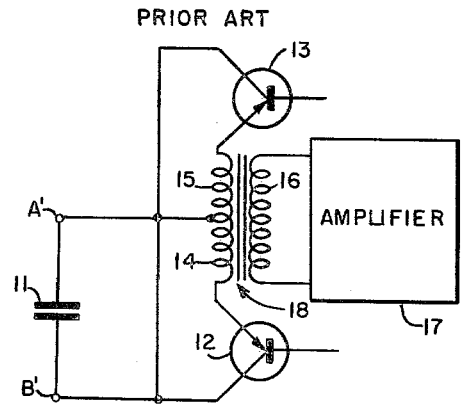
FIG.2.
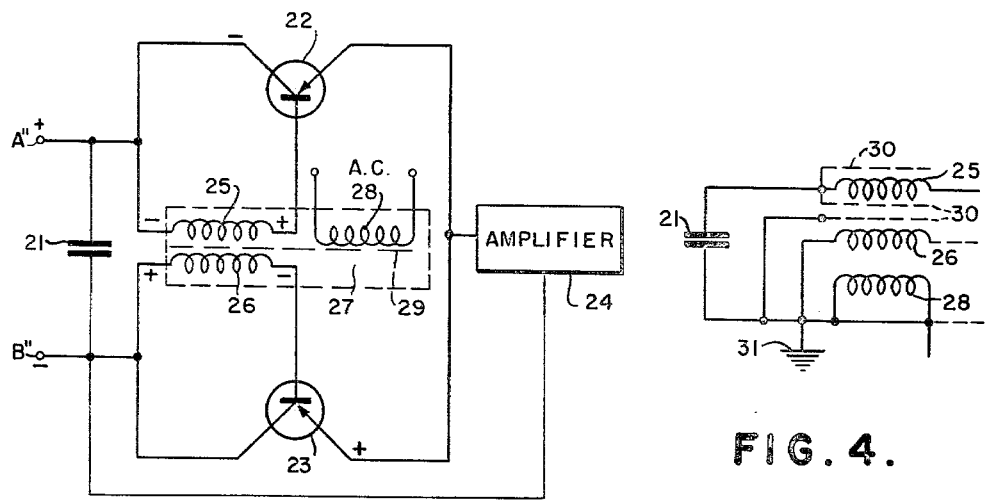
FIG.3.
FIG.4.

United States Patent Office 3,201,689
Patented Aug. 17, 1965

3,201,689
MEASUREMENT AMPLIFIER FOR SMALL DIRECT VOLTAGES
Ulrich Knick, Milinowskistrasse 35, Berlin-Zehlendorf, Germany
Filed Oct. 19, 1960, Ser. No. 63,641
Claims priority, application Germany, Oct. 24, 1959, K 39,000; Apr. 23, 1960, K 40,491; May 14, 1960, K 40,706
9 Claims. (Cl. 324—120)

This invention relates to a measurement amplifier for small direct voltages and more particularly to an amplifier in which the value to be measured is converted to alternating voltage by a periodically operated switch, such as a transistor.

For transistors operating as inverters, a control or auxiliary current is applied between the base and the collector thereof and the emitter-collector path is used as a switch circuit. Upon the flow of base current, a small residual voltage of a few tenths of a millivolt is produced between the emitter and the collector. Upon positive biasing of the base with respect to the collector, the base is consequently without current and a small residual current flows through the collector-emitter path. When a direct voltage, which is to be measured, is connected through such a transistor switch with the input of the alternating current amplifier, a measurement error is therefore produced in the value of the transistor's residual potential. This error is created as a result of two conditions. First, during the half-cycle when the transistor is conducting, there is a small residual voltage between the emitter and the collector, which adds to or subtracts from the direct voltage. This causes the crest of the square wave form being fed into the amplifier through the periodic interruption in the direct voltage by the transistor to be slightly too high or too low. Secondly, during part of or the whole of the half cycle when the transistor should not be conducting, a small residual current does in fact flow so that the trough of the square waves does not properly coincide with the zero line.

A circuit has also been arranged in which two transistors are alternately connected and disconnected, and are operated on two oppositely polarized windings of a transformer. However, a problem presents itself in that the residual voltages of the two transistors add onto each other. Further, when the input or signal voltage is zero, an A.C. voltage is nevertheless generated in the primary winding of the transformer which is equal to the residual voltage of the transistors. The resistance in this open state of the circuit is not infinite, however, therefore there is a residual current flow. This residual current has a disagreeable effect of flowing backwards to the source voltage to be measured, and of generating a voltage drop across the inner resistance of the voltage source which results in a further and most pronounced measurement error. Inasmuch as the two transistors are in parallel arrangement their residual currents consequently add up and aggravate the error. The residual currents of the transistors vary markedly with temperature change, therefore it is not possible for them to be compensated for easily.

An object of this invention, therefore, is to arrange two transistors in such manner that both the residual voltages and the residual currents compensate each other so that by simply matching transistors of equal voltage and current ratings, compensation may be achieved so that correct operation is maintained over a wide temperature range. Accordingly the two switch transistors are connected to each other with opposite polarity, the two collectors being each connected with a terminal of the electrical quantity to be measured and the two emitters being connected with each other and with the input of the alternating current amplifier. The control voltages applied between base and collector are taken from two windings of a transformer, inasmuch as the measurement of the electrical quantity occurs between the two collectors, and the two voltage circuits must therefore be separated from each other. It has been advisable to bridge the input leads with a capacitor in order to prevent the production of disturbing alternating voltages between the two collectors. The last mentioned alternating or noise voltages are produced by the harmful capacitances of the transistors and transformers.

It is also advisable to screen the transformer windings from each other to prevent alternating voltages from the transistors from building up on the aforementioned bridging capacitor. These alternating voltages create a measurement error because the two transistors do not transmit the average time value of the capacitor but rather the actual momentary value of the capacitor voltage to the A.C. amplifier.

In the arrangement of this invention the residual voltages of the switch transistors cancel each other, inasmuch as the transistors are connected in the same direction, each with one terminal of the direct voltage to be measured. Furthermore, the residual currents are also balanced out since the two transistors are so connected behind each other as to have opposite polarity with respect to the signal voltage to be measured.

In the known art, the control voltage applied to the bases of the transistors is usually a square wave voltage, both transistors being alternately opened and closed. With such square wave or approximate square wave switching, however, the transistors are not blocked rapidly enough, since the charges stored in the base of the transistors dissipate only slowly so that both transistors are connected for a short time. Thus, a stronger current is periodically drawn for a short duration from the circuit to be measured and the input resistance of the amplifier is reduced accordingly.

A further object of this invention, therefore, is to eliminate the latter disadvantage by developing the control voltage wave-form in the shape of a keystone so that the alternate switching occurs after the disturbing base charges have been dissipated.

In the known system wherein the direct signal to be measured is converted to alternating voltage by a periodically operated switch, then amplified by an alternating voltage amplifier, and finally rectified by a synchronized second switch, in order to obtain a high degree of accuracy, it has been customary to apply a direct current feed-back from the amplifier output to the amplifier input. In the feedback circuit a filter is usually inserted to eliminate the alternating current ripple from the rectified feed back direct current to prevent the A.C. ripple from passing through the rectifier into the input of the amplifier and causing undesired noise.

Technical difficulties arise when a very high value of the direct current feedback is selected because the filtering effect of the filter components must be correspondingly high.

This in turn leads to impractical dimensions of single filter chains, and in multi-filter chains it leads to phase shifts of more than 90 degrees, thereby resulting in oscillatory motion of the measuring instrument indicator.

Accordingly, another object of this invention is to obtain a high degree of amplification accuracy by dividing the required highly accurate feedback into a direct current feedback component and an alternating current feedback component limited to the A.C. amplifier. The alternating current feedback reduces only the instabilities of the alternating current amplifier, but has no effect upon the errors of the periodically operated and synchronized switches which serve as inverter and rectifier.

Errors caused by non-constant resistors and chokes of the inverter and rectifier in the A.C. feedback circuit are thereby reduced.

In the arrangement of this invention the inverter and rectifier are designed as two-way installations, the alternating current feedback flowing through their contacts alternately during predetermined time intervals. Electronic switches consisting of two transistors each are most advantageously used in the inverter switch and rectifier switch of this invention.

For an understanding of the invention arrangements reference is made to the following description of typical embodiments thereof as illustrated in the accompanying drawings:

FIG. 1 is a schematic circuit diagram showing an arrangement known in the art of a single transistor used as an inverter;

FIG. 2 is a schematic circuit diagram showing an arrangement also known in the art of two transistors employed as inverters;

FIG. 3 is a schematic circuit diagram of the present invention showing a novel arrangement of two transistors as inverters;

FIG. 4 is a schematic fragment of the circuit diagram shown in FIG. 3;

Figure 5:
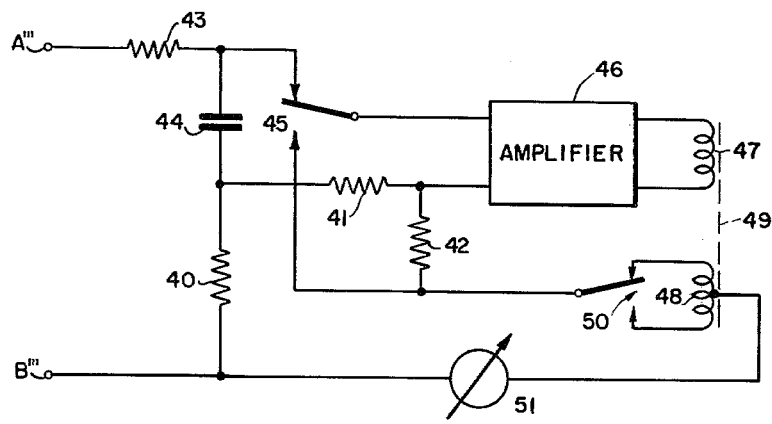
FIG. 5 is a schematic diagram of a novel arrangement including the arrangement of FIG. 3 shown as a switch.

As shown in FIG. 1, according to the present state of the art, the voltage to be measured is applied across the condenser 1 at terminals A, B. A resistor 2 connects terminal A with the input of an alternating current amplifier 3, whereas terminal B is connected directly with the amplifier 3. A transistor 4 acting as a switch is connected parallel to the input of the amplifier 3. The base of the transistor 4 is connected to the secondary winding 5 of a transformer 6. The primary winding 7 of transformer 6 is connected to a control alternating voltage source (not shown) which causes the transistor switch 4 to close or open alternately. When the transistor 4 is open there is no voltage drop across resistance 2, therefore the voltage at the amplifier 3 input is equal to the voltage of the capacitor 1. When the transistor 4 is closed the voltage at the amplifier 3 input is zero, therefore the direct voltage to be measured is converted into an alternating voltage of equal size. This circuit is subject to the aforementioned inaccuracies.

Another well known circuit is that of the inverter in FIGURE 2 which employs two transistors. The signal voltage to be measured across the capacitor 11 at terminals A', B' appears alternately across both the transistor 12 and the primary winding 14 of the transformer 18, and across both the transistor 13 and the primary winding 15 of the transformer 18. The secondary winding 16 of the transformer 18 is connected to the input of amplifier 17. The bases of the transistors 12, 13 are controlled by auxiliary voltages in such a manner (not shown) that alternately one transistor is closed while the other is open. When the transistor 12 is closed, the voltage on winding 14 equals the voltage of capacitor 1, and when the transistor 13 is closed the voltage on winding 15 equals the voltage of capacitor 1. The windings 14, 15 are of opposite polarity.

There is thus generated in the transformer 18 an alternating voltage which is impressed upon the A.C. amplifier 17 through the secondary winding 16. Although the signal voltage across terminals A', B' may be zero an A.C. voltage is nevertheless generated alternately on the primary winding 14, 15 of the transformer 18, which equals the residual voltage respectively of transistors 12, 13. As heretofore mentioned, this also results in measurement error.

In the arrangement of the present invention as shown in FIG. 3, the voltage to be measured is tapped by the two terminals A", B" across which a capacitor 21 is connected. The two terminals A", B" are connected with collectors of two transistors 22, 23. The emitters of transistors 22, 23 are connected with each other and with the input of the alternating current amplifier 24. The secondary windings 25, 26 of the transformer 27 are each connected between the base and the collector of one of the transistors 22, 23, while the primary winding 28 of the transformer 27 is connected with a source of suitable control voltage (not shown). The secondary windings 25, 26 are so disposed in relation to the primary winding 28 so as to provide opposite polarity to the bases of the transistors 22, 23, whereby one transistor is non-conducting when the other is conducting. The secondary windings 25, 26 are shielded from each other by a suitable screen 29.

When measuring an input direct voltage the latter is fed through the terminals A", B" to the collectors of transistors 22, 23. The alternating voltage in the primary winding 28 of the transformer 27 induces alternating control voltages of opposite polarity in the secondary windings 25, 26 which are applied between the bases and collectors of transistors 22, 23. The capacitor 21 which bridges the terminals A", B" prevents the development of noise voltages between the collectors of transistors 22, 23, produced by capacitance effects of the transistors 22, 23 and the transformer 27. The screen 29 further reduces the production of the aforementioned noise voltages. Inasmuch as the transistors 22, 23 are connected in the same direction, each with one terminal of the signal to be measured, the residual voltages of the transistors cancel each other. Furthermore, the residual currents are also cancelled as the transistors are connected with opposite polarity behind each other with respect to the signal to be measured.

The effect of the transistor switching circuit shown in FIG. 3 is such that the input terminal to the alternating voltage transformer 27 which is also connected to the emitters of both transistors 22, 23, is alternately connected to one or the other terminal of the capacitor 21 across which the voltage to be measured is applied. When the residual voltage of transistors 22, 23 are equal, the peak values of the alternating voltage are changing by the same amount. With respect to the amplitude of the alternating voltage (peak to peak) the transistor errors cancel each other out. The same is true for the residual current of the transistor. Assuming the resistance of the input voltage source to be infinite, during a half-wave pulse assume one transistor is non-conducting while the other is conducting. The transistors are in series relative to the voltage to be measured and the residual current of the conducting transistor charges the capacitor 21 in one direction. During the other half-wave pulse of the control voltage the previously conducting transistor becomes non-conducting and the previously non-conducting transistor becomes conducting. Now the residual current of the latter transistor flows into the capacitor 21, but in the opposite direction.

In FIG. 4 is represented diagramatically the manner of shielding the transformer windings of FIGURE 3. The dashed lines 30 represent copper foils which are laid between the transformer windings to be screened. It is assumed that one terminal of the capacitor 21 is grounded as at 31 and that one terminal of the primary winding 28 of the transformer 27 is also at ground potential. The copper foils 30 are also shown to be grounded. When the windings are so arranged as to consist of an inner and an outer winding a single screening against the adjacent winding is sufficient, as shown in the figure.

In a novel arrangement of this invention as shown in FIG. 5 the voltage to be measured is tapped by the terminals A''', B''', passes through a filter arrangement consisting of the resistor 43 and condenser 44 (the purpose of which will be described below) to the inverter 45 which converts it to alternating voltage. This alternating voltage is then amplified in the alternating current amplifier 46. The output of the amplifier 46 is fed into the primary winding 47 of a transformer 49. The induced signal in the secondary winding 48 of the transformer 49 is led to the rectifier 50 (which is operated synchronously with the inverter 45) and fed back rectified to a circuit including resistors 40, 41 and 42 and a direct current measuring instrument 51. (The indication of the instrument 51 is thus an amplified measure of the input voltage across the terminals A''', B'''.) Resistors 40, 41 and 42 in this circuit are feedback resistors, resistor 40 having the effect of the usual direct current feedback resistor whereas resistors 41 and 42 act as alternating current feedback resistors (as will be described in greater detail below).

The inverter 45 is shown diagrammatically as a mechanical switch in FIGURE 5, but actually represents the electronic switching arrangement of FIGURE 3 which is to be substituted therefor.

The rectifier 50 which can be a half-way rectifier, but is preferably a full-wave rectifier (as shown), is likewise diagrammatically indicated as a mechanical switch, but actually represents an electronic switching arrangement incorporating transistors.

Figure 6:
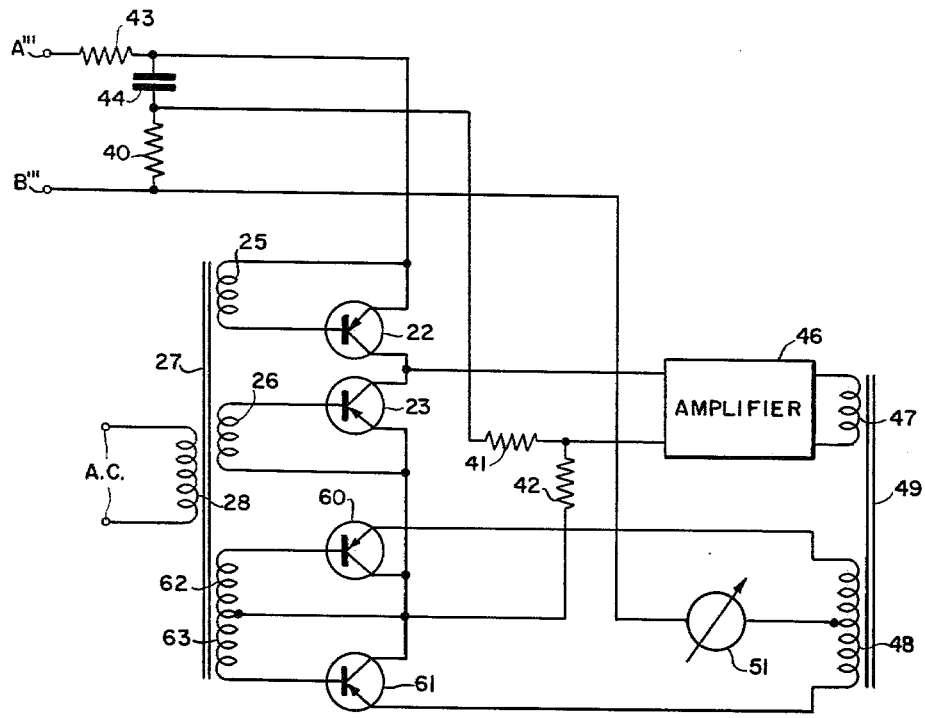
FIG. 6 is a schematic fragment of the circuit diagram of FIG. 5.

The full circuit of the arrangement of FIGURE 5, incorporating transistors in place of the switches 45 and 50, is shown in FIGURE 6. The electronic rectifier replacing the switch 50 comprises two transistors 60, 61, which are controlled synchronously with the transistor pair 22, 23 in the amplified input. The control voltages for this synchronous control can be suitably generated by means of an additional secondary winding of the transformer 27, divided by a center tapping into two equal windings 62, 63, which are respectively connected to the base-collector circuits of the transistors 60 and 61, whereby these transistors are rendered alternately conducting and non-conducting in synchronism with the transistors 22 and 23, the arrangement being such that in one half wave the transistors 22 and 60 are conducting and the transistors 23 and 61 are non-conducting, and in the other half wave the transistors 23 and 61 are conducting and the transistors 22 and 60 non-conducting. The collectors of the transistors 60 and 61 are connected together and to the resistor 42, while the emitters of the transistors 60 and 61 are respectively connected to the two ends of the secondary winding 48 of the transformer 49. In other respects the circuit of FIGURE 6 is identical with that of FIGURE 5, and it will be clear that the operation of the transistor pairs 22, 23 and 60, 61 corresponds exactly to that of the diagrammatic representation thereof in FIGURE 5 respectively by the switches 45 and 50.

The rectified output of the transformer secondary winding 48 is applied, not only to the meter 51, but also to the feedback resistors 40, 41 and 42. The voltage drop across the resistor 40, which is in series with the main input circuit including the terminals A''', B''', the resistance 43 and the capacitor 44, causes a feedback voltage to be superimposed on the main input voltage and to be applied therewith to the amplifier input during the halfwave when the switch 45 is in its upper position, as shown in FIGURE 5 (that is when the transistor 22 is conducting. This feedback voltage, like the main input voltage, is cut off altogether in the other half wave when the switch 45 is in its lower position (that is when the transistor 22 is non-conducting).

The filter constituted by the resistor 43 and the capacitor 44 acts to smooth out the residual alternating current ripple in the rectified voltage across the resistor 40, so that the feedback due to the voltage drop across this resistor is a true direct current feedback.

At the same time, another feedback derived from the voltage drops across the resistors 41 and 42 is applied to the amplifier input, this feedback being controlled both by the inverter 45 (transistors 22, 23) and by the rectifier 50 (transistors 60, 61).

In the half wave when the switches 45 and 50 are in their upper positions (that is when the transistors 22 and 60 are conducting), the resistor 41 is in series in the main input circuit between the capacitor 44 and the amplifier 46, and its voltage drop is thus superimposed on the main input voltage and applied therewith to the amplifier input. In the other half wave, when the switches 45 and 50 are in their lower positions (that is when the transistors 22 and 60 are non-conducting and the transistors 23 and 61 are conducting), this voltage drop across the resistor 41 is cut off by the switch 45 (transistors 22, 23) from the amplifier, and the voltage drop across the resistor 42 is directly applied through the switch 45 (transistors 22, 23) to the amplifier input in the direction opposite to that of the feedback voltage due to the voltage drop across the resistor 41 in the previous half wave. This feedback due to the voltage drops across the resistors 41 and 42 thus has the effect of an alternating voltage feedback, but has the advantage that there is no harmful interaction with the direct current feedback above described, such as there would be with a normally generated alternating voltage feedback. This feedback, although having the effect of an alternating voltage feedback, can be more properly described as a mixed direct and alternating feedback, since in one half wave it is applied in a circuit including the filter capacitor 44, while in the other half wave it is directly applied to the amplifier input independently of such capacitor. The arrangement is such that the appropriate phase relationships are maintained to ensure proper action of this feedback.

I claim:

1. A measurement amplifier circuit for measuring small direct voltages, comprising two matching transistors, means for connecting the emitters of the two transistors to one another, means for feeding a control alternating voltage to the base-collector circuits of such transistors whereby the transistors operate as electronic switches, means for connecting the two poles of the direct voltage to be measured respectively to the collectors of the two transistors, whereby the transistors act to convert such direct voltage into one alternating voltage, an amplifier, means for connecting one input terminal of the amplifier to the junction point of the emitters of the two transistors, and means for connecting the other amplifier input terminal to the collector of one only of the two transistors, thereby feeding input to the amplifier during alternate half-cycles of the control voltage, whereby the output of the amplifier represents an amplified measure of the direct voltage to be measured.

2. A circuit according to claim 1, in which the means for feeding the control voltage to the two transistors, includes a transformer having a primary winding energized by the control voltage and two secondary windings for oppositely applying voltage to the two base-collector circuits, whereby the switch operation of the two transistors takes place in alternate half-cycles of the control voltage.

3. A circuit according to claim 2, including means for screening the two transformer secondary windings from one another and from the transformer primary windings.

4. A circuit according to claim 1, including a capacitor connected across the circuit through which the direct voltage to be measured is fed to the two transistors.

5. A circuit according to claim 1, wherein the alternating control voltage is given a trapezoidal wave form whereby the periodic switching reversal of the two transistors occurs only after the base charges thereof have dissipated.

6. A measurement amplifier circuit for measuring small D.C. voltages, comprising two-way switching means constituting a converter, means for applying the D.C. voltage to be measured to the converter and thereby converting it into an A.C. voltage, an amplifier, means for applying the A.C. voltage output of the converter to the amplifier, two-way switching means constituting a rectifier, means for applying the amplifier output to the rectifier, means for operating the converter switching means and the rectifier switching means in synchronism with one another, a measuring instrument, filter means, means for applying the rectifier output to the measuring instrument in circuit with such filter means, a D.C. feed-back circuit cooperating with the filter means and feeding back from the rectifier output to the input side of the amplifier, and a mixed A.C.-D.C. feed-back circuit feeding back from the amplifier output through the rectifier switching means and through the converter switching means to the input of the amplifier.

7. A measurement amplifier circuit as claimed in claim 6, including a transformer for feeding the amplifier output to the rectifier input, a capacitance connected across the D.C. voltage to be measured, and resistances included in the feed-back circuits.

8. A measurement amplifier circuit as claimed in claim 6, in which each of the two switching means comprises two transistors, and the means for operating the two switching means in synchronism comprise a source of control A.C. voltage common to the two pairs of transistors, whereby the two transistors of each pair operate as electronic switches in opposite half-cycles of the control voltage.

9. A measurement amplifier circuit for measuring small D.C. voltages, comprising two transistors together constituting a converter, a source of control A.C. voltage, means for connecting such source to the base-collector circuits of the two transistors whereby such transistors operate alternatively as electronic switches, means for feeding the D.C. voltage to be measured to the converter whereby the two transistors act to convert such D.C. voltage into an A.C. voltage, an amplifier, means for feeding the A.C. output voltage of the converter to the amplifier input, two transistors together constituting a rectifier, means for connecting the source of control A.C. voltage to the base-collector circuits of such rectifier transistors whereby the two rectifier transistors operate alternately as electronic switches in synchronism with the two converter transistors, means for applying the amplifier output to the rectifier, a measuring instrument, filter means, means for feeding the rectifier output to the measuring instrument in circuit with such filter means, feed-back resistances, a D.C. feed-back circuit incorporating at least one feed-back resistance cooperating with the filter means and feeding back from the rectifier output to the input side of the amplifier, and a mixed A.C.-D.C. feed-back circuit incorporating feed-back resistances and feeding back from the amplifier output through the rectifier transistors and through the converter transistors to the amplifier input.

References Cited by the Examiner

UNITED STATES PATENTS

| 2,302,049 | 11/42 | Parker et al. | 324—120 |
| 2,413,788 | 1/47 | Sargeant et al. | 321—2 |
| 2,438,518 | 3/48 | Piety | 324—119 |
| 2,459,730 | 1/49 | Williams | 324—118 |
| 2,888,627 | 5/59 | Kompelien et al. | 321—44 |
| 3,050,675 | 8/62 | Williams | 324—118 |

LLOYD McCOLLUM, *Primary Examiner.*

SAMUEL BERNSTEIN, RALPH L. SIMS, *Examiners.*